United States Patent
Covell et al.

(10) Patent No.: US 11,403,847 B2
(45) Date of Patent: Aug. 2, 2022

(54) SHARING SYSTEM SELECTION ASSISTANT

(71) Applicant: International Business Machines Corporation, Armonk, NY (US)

(72) Inventors: Jacob T. Covell, New York, NY (US); Thomas J. Sandridge, Tampa, FL (US); Zachary A. Silverstein, Jacksonville, FL (US); Pranav Chunduri, Cary, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 16/821,688

(22) Filed: Mar. 17, 2020

(65) Prior Publication Data

US 2021/0295044 A1  Sep. 23, 2021

(51) Int. Cl.
| | |
|---|---|
| *G06V 20/20* | (2022.01) |
| *G06F 16/9535* | (2019.01) |
| *G06F 16/9537* | (2019.01) |
| *G06F 16/9538* | (2019.01) |
| *G06Q 50/30* | (2012.01) |
| *G06Q 30/06* | (2012.01) |
| *G06N 3/08* | (2006.01) |
| *G06K 7/14* | (2006.01) |
| *G06Q 30/02* | (2012.01) |
| *G16Y 10/40* | (2020.01) |
| *G06Q 10/00* | (2012.01) |

(52) U.S. Cl.
CPC ......... *G06V 20/20* (2022.01); *G06F 16/9535* (2019.01); *G06F 16/9537* (2019.01); *G06F 16/9538* (2019.01); *G06K 7/1413* (2013.01); *G06K 7/1417* (2013.01); *G06N 3/08* (2013.01); *G06Q 30/0278* (2013.01); *G06Q 30/0631* (2013.01); *G06Q 50/30* (2013.01); *G06Q 10/20* (2013.01); *G16Y 10/40* (2020.01)

(58) Field of Classification Search
None
See application file for complete search history.

(56) References Cited

U.S. PATENT DOCUMENTS

| | | | |
|---|---|---|---|
| 8,866,847 | B2 | 10/2014 | Bedi et al. |
| 9,288,270 | B1 | 3/2016 | Penilla et al. |
| 9,633,488 | B2 | 4/2017 | Carnell et al. |

(Continued)

FOREIGN PATENT DOCUMENTS

WO    2018232690 A1    12/2018

OTHER PUBLICATIONS

Qian et al., "Learning User Preferences By Adaptive Pairwise Comparison," 41st International Conference on Very Large Data Bases, Aug. 31-Sep. 4, 2015, Kohala Coast, Hawaii; Proceedings of the VLDB Endowment, vol. 8, No. 11, pp. 1322-1333, 2015.

(Continued)

*Primary Examiner* — Jeffrey J Chow
(74) *Attorney, Agent, or Firm* — Haley J. McClory

(57) ABSTRACT

A cognitive augmented reality selection assistant of a personal imaging system provides users with recommendations to best fit their needs in real time through AR overlay of the personal transportation. The personal imaging system allows real time input to be provided, including alterations to the personal transportation or recognition of possible faulty equipment associated with the personal transportation.

18 Claims, 6 Drawing Sheets

(56) References Cited

U.S. PATENT DOCUMENTS

| | | |
|---|---|---|
| 9,760,776 B1 | 9/2017 | Wilbert et al. |
| 2012/0246027 A1 | 9/2012 | Martin |
| 2019/0099681 A1* | 4/2019 | Rico .................... H04N 9/3182 |
| 2019/0139335 A1 | 5/2019 | Morawitz et al. |
| 2019/0141479 A1* | 5/2019 | Jiang ......................... G01S 5/14 |
| 2019/0147073 A1* | 5/2019 | Bakir .................... G06V 10/40 |
| | | 382/305 |
| 2019/0206147 A1 | 7/2019 | Abuelsaad et al. |
| 2019/0384874 A1* | 12/2019 | Riley .................... G06T 15/005 |
| 2020/0286106 A1* | 9/2020 | Candeli .................. G06Q 50/30 |
| 2020/0309557 A1* | 10/2020 | Efland .................... G01C 21/20 |
| 2021/0049822 A1* | 2/2021 | Meriaz .................. G06F 3/0482 |
| 2021/0270617 A1* | 9/2021 | Spielman ............... H04W 4/024 |
| 2021/0279796 A1* | 9/2021 | Simpson ................ G06Q 50/01 |
| 2021/0331702 A1* | 10/2021 | Kim .................. G01C 21/3407 |

OTHER PUBLICATIONS

Laudy et al., "Toward Building an Individual Preference Model for Personalizing Settings in the Vehicle," 2018 IEEE 88th Vehicular Technology Conference (VTC-Fall), Chicago, IL, 2018, pp. 1-5.
Bell et al. "Information at a glance [augmented reality user interfaces]," in IEEE Computer Graphics and Applications, vol. 22, No. 4, pp. 6-9, Jul.-Aug. 2002.
Krueger et al. "Preferences for shared autonomous vehicles"; Transportation Research Part C: Emerging Technologies vol. 69, Aug. 2016, pp. 343-355.

* cited by examiner

SHARING SYSTEM SELECTION ASSISTANT

BACKGROUND

The present invention relates to a resource sharing system, and more specifically to a cognitive augmented reality selection assistant for a resource sharing system.

Resource sharing systems are being used in relation to urban transportation. Between congested traffic and fixed subway and bus routes, it can prove difficult to efficiently travel between locations in an urban area at any given point during the day. Resource sharing related to personal transportation, such as bike or scooter sharing attempts to alleviate these issues by offering an accessible, affordable way to traverse through cities.

As more and more users are using bicycle or scooter sharing to handle their transportation needs, users are looking for recommendations of how to better enhance their experience. Some users want to ensure they get to their destination as quickly as possible, while others are searching for a smooth, leisurely ride. Some users want to confidently select a bike or scooter that will not have maintenance issues or breakdown during their ride. Regardless of what the specific aim may be, the user wants to ensure that the personal transportation that they selected meets their requirements. With all of the different options available, it can be difficult for an unknowledgeable user to select personal transportation with the appropriate characteristics to meet their criteria.

SUMMARY

According to one embodiment of the present invention, a method of providing personal transportation recommendations via a personal imaging system in real time to a user is disclosed. The method comprising the steps of: the personal imaging system searching for personal transportation available for selection; the personal imaging system identifying the personal transportation available based on identified identifiers of the personal transportation available; the personal imaging system analyzing a current state of the personal transportation available; the personal imaging system determining an optimal personal transportation selection for the user from the personal transportation available; the personal imaging system projecting a notification indicating the determined optimal personal transportation onto the personal transportation available for selection for the user in real time; the personal imaging system recording a selection of the user of the personal transportation for use by the user; and the personal imaging system projecting at least one of an adjustment to or notification regarding the personal transportation selected in real time to accommodate a preference of the user onto the personal transportation selected.

According to another embodiment of the present invention, a computer program product for providing personal transportation recommendation via a personal imaging system in real time to a user is disclosed. The personal imaging system having a computer comprising at least one processor, one or more memories, one or more computer readable storage media, the computer program product comprising a computer readable storage medium having program instructions embodied therewith, the program instructions executable by the computer to perform a method comprising: searching, by the computer of the personal imaging system, for personal transportation available for selection; identifying, by the computer of the personal imaging system, the personal transportation available based on identified identifiers of the personal transportation available; analyzing, by the computer of the personal imaging system, a current state of the personal transportation available; determining, by the computer of the personal imaging system, an optimal personal transportation selection for the user from the personal transportation available; projecting, by the computer of the personal imaging system, a notification indicating the determined optimal personal transportation onto the personal transportation available for selection for the user in real time; recording, by the computer of the personal imaging system, a selection of the user of the personal transportation for use by the user; and projecting, by the computer of the personal imaging system, at least one of an adjustment to or notification regarding the personal transportation selected in real time to accommodate a preference of the user onto the personal transportation selected.

According to another embodiment of the present invention, a personal imaging system for providing personal transportation recommendation to a user in real time is disclosed. The personal imaging system comprising a computer comprising at least one processor, one or more memories, one or more computer readable storage media having program instructions executable by the computer to perform the program instructions comprising: searching, by the computer of the personal imaging system, for personal transportation available for selection; identifying, by the computer of the personal imaging system, the personal transportation available based on identified identifiers of the personal transportation available; analyzing, by the computer of the personal imaging system, a current state of the personal transportation available; determining, by the computer of the personal imaging system, an optimal personal transportation selection for the user from the personal transportation available; projecting, by the computer of the personal imaging system, a notification indicating the determined optimal personal transportation onto the personal transportation available for selection for the user in real time; recording, by the computer of the personal imaging system, a selection of the user of the personal transportation for use by the user; and projecting, by the computer of the personal imaging system, at least one of an adjustment to or notification regarding the personal transportation selected in real time to accommodate a preference of the user onto the personal transportation selected.

DETAILED DESCRIPTION

Figure 1:
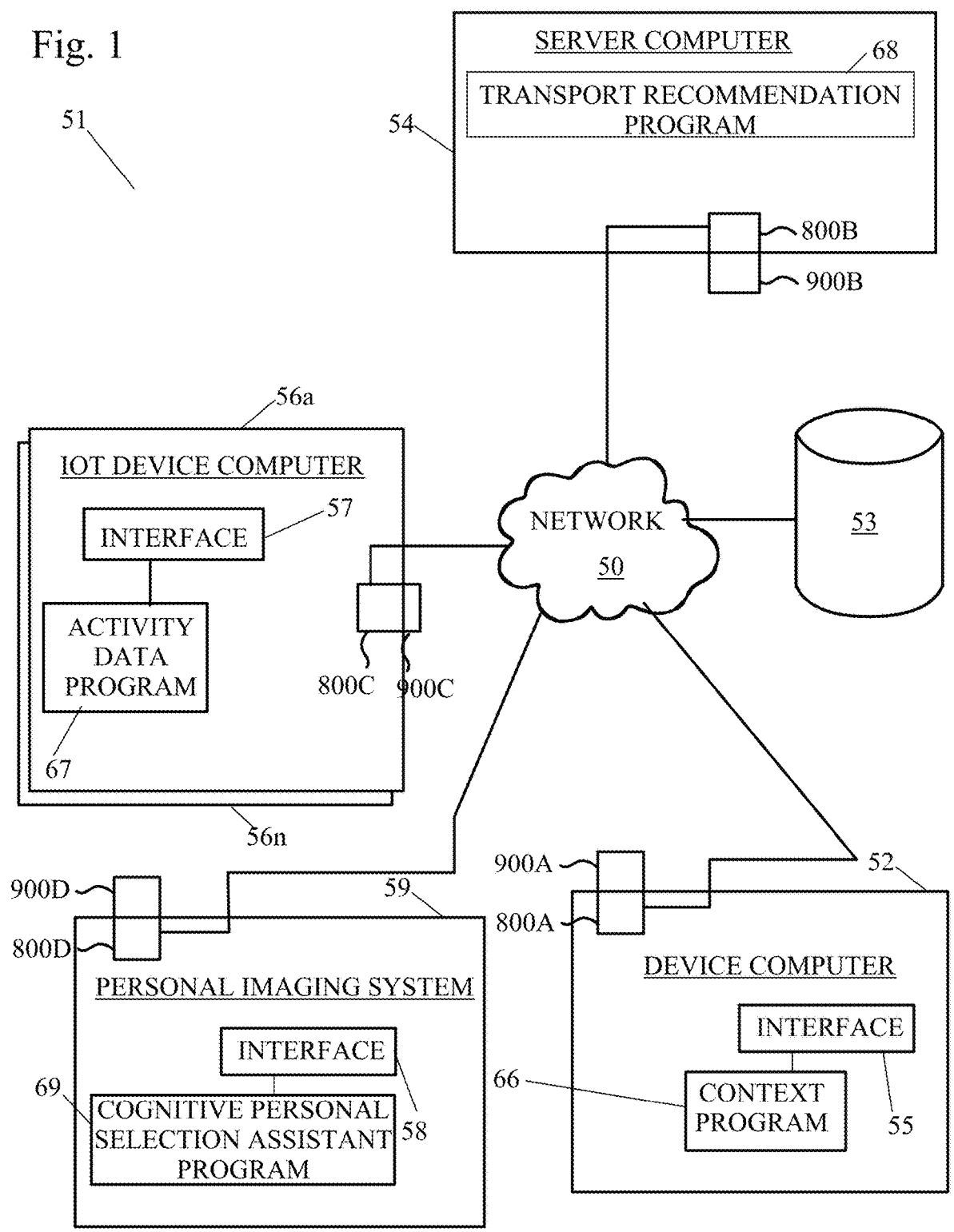
FIG. 1 depicts an exemplary diagram of a possible data processing environment in which illustrative embodiments may be implemented.

According to an embodiment of the present invention, a cognitive augmented reality (AR) selection assistant of a personal imaging system provides users with recommendations to best fit their needs in real time through an AR overlay of the personal transportation. The embodiment of the present invention allows real time input to be provided, including alterations to the personal transportation or recognition of possible faulty equipment associated with the personal transportation.

Personal imaging systems are wearable computers which add information onto a reality or actually help people see better. Personal imaging systems may use an optical head-mounted display (OHMD) or computerized internet-connected glasses with transparent heads-up display (HUD) or augmented reality (AR) overlay that has the capability of reflecting projected digital images, which can be seen through the personal imaging system by the user. Augmented reality can be provided to the user through smart glasses, other glasses or eye pieces, or through a mobile device.

In another embodiment of the present invention, the personal transportation preferably has a unique identifier, such as a license plate, bar code, quick response (QR) code, numeric code, or other alphanumeric code to identify the personal transportation from a distance as well as provide a reference point for characteristics associated with the personal transportation in a repository. In another embodiment, the personal transportation can include Internet of Things (IoT) sensors to capture use associated with the personal transportation.

In an embodiment, the personal transportation is preferably a bicycle, a scooter, a motorcycle, or other two or three wheeled personal transportation. In an embodiment, the personal transportation preferably accommodates one person. In another embodiment, the personal transportation preferably accommodates two people. In another embodiment, the personal transportation preferably accommodates three people. For brevity, examples will be given and discussed relative to bicycles, but applies to the personal transportation identified above.

In an embodiment of the present invention, it is recognized that the cognitive augmented reality (AR) selection assistant of a personal imaging system is a learning based system which utilizes input from various IoT devices to derive personal transportation health, personal transportation configuration details, personal transportation data and user preferences to cognitively determine and generate AR notifications in real time which display one or more of: the optimal personal transportation to select, based on personal transportation attributes, user profile and user predicted needs; safety notifications; and suggested adjustments to maximize the user's experience.

In an embodiment of the present invention, depreciation associated with the personal transportation can additionally be estimated. For example, a depreciation amount can be estimated based on the features of the personal transportation and be added as a factor associated with the "health" of the personal transportation. For example, a user may be interested in personal transportation worth more money than personal transportation which is older and therefore worth less.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a device computer 52, Internet of Things (IoT) device computer 56a-56n, a personal imaging system computer 59, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding user preferences, a destination, a starting point, context associated with personal transportation, previous selections of personal transportation, and other data. The interface 55 can be, for example, a command line interface, a graphical user interface (GUI), a natural user interface (NUI) or a touch user interface (TUI). The device computer 52 preferably includes context program 66. While not shown, it may be desirable to have the context program 66 be present on the server computer 54. The device computer 52 includes a set of internal components 800a and a set of external components 900a, further illustrated in FIG. 2. The device computer 52 is preferably a mobile device, a smartphone, or a desktop computer. While not shown, the device computer 52 can receive data from the IoT device computers 56a-56n directly and not just through the network 50.

The IoT device computers 56a-56n may contain an interface 57, which may accept commands and data entry from a user. The commands may be regarding selection of an activity and entering of biometric user data. The interface 57 can be, for example, a command line interface, a graphical user interface (GUI), a natural user interface (NUI) or a touch user interface (TUI). The IoT device computers 56a-56n preferably includes activity data program 67. While not shown, it may be desirable to have the activity data program 67 be present on the server computer 54. The IoT device computers 56a-56n includes a set of internal components 800c and a set of external components 900c, further illustrated in FIG. 2. The IoT device computer 56a-56n is preferably any wearable device that records a user's activity, location, or biometrics.

The personal imaging system computer 59 may contain an interface 58, which may accept commands and data entry from a user. The commands may be regarding selection of personal transportation or other information. The interface 58 can be, for example a graphical user interface (GUI). The personal imaging system computer 59 preferably includes a cognitive personal selection assistant program 69. While not shown, it may be desirable to have the cognitive personal selection assistant program 69 be present on the server computer 54. The personal imaging system computer 59 includes a set of internal components 800d and a set of external components 900d, further illustrated in FIG. 2. The personal imaging system computer 59 is preferably an optical head-mounted display (OHMD) or computerized internet-connected glasses with transparent heads-up display (HUD) or augmented reality (AR) overlay that has the capability of reflecting projected digital images.

Figure 2:
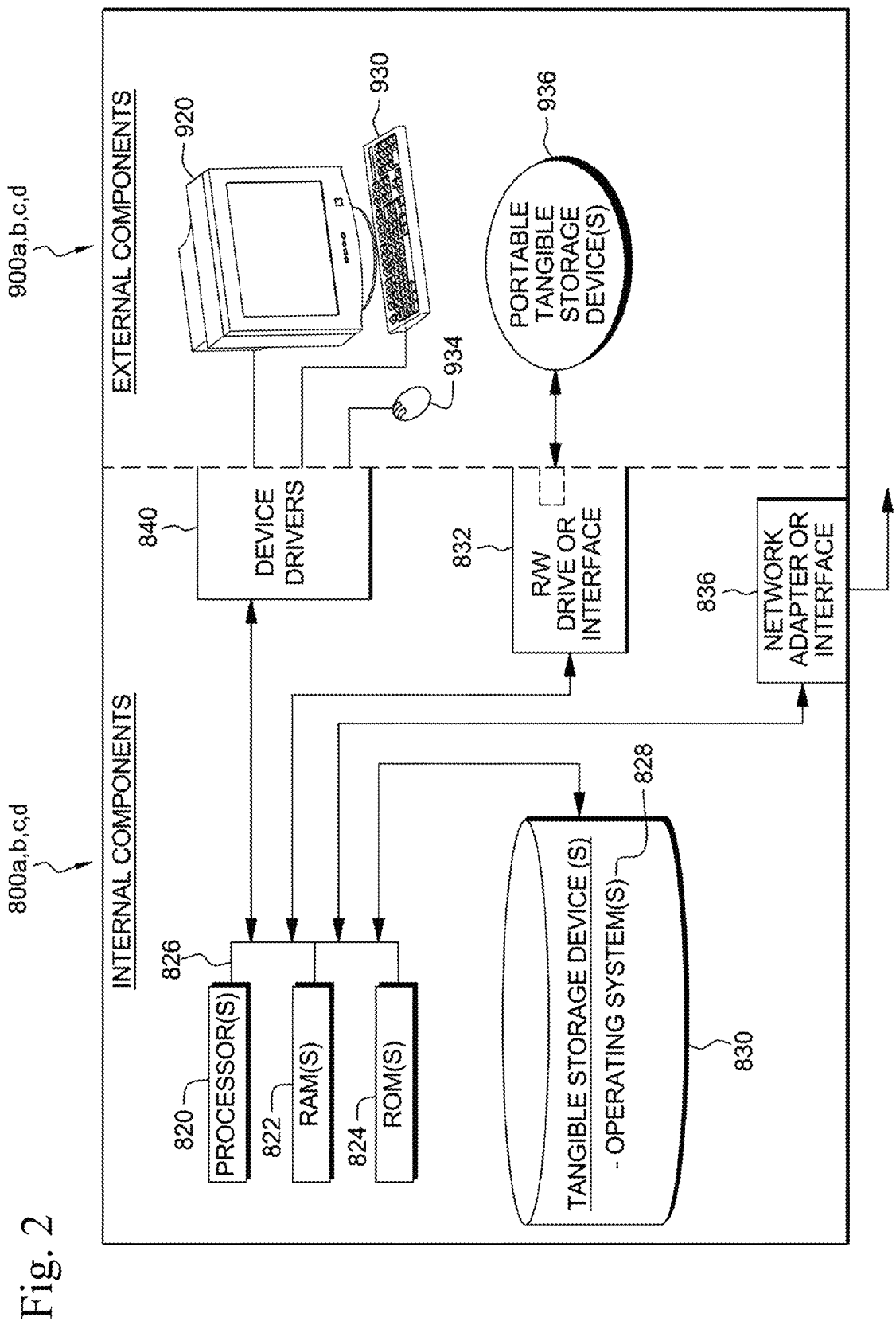
FIG. 2 illustrates internal and external components of a client computer and a server computer in which illustrative embodiments may be implemented.

Server computer 54 includes a set of internal components 800b and a set of external components 900b illustrated in FIG. 2. In the depicted example, server computer 54 provides information, such as boot files, operating system images, and applications to the device computer, IoT device computer, and personal imaging system computers 52, 56a-56n, 59. Server computer 54 can compute the information locally or extract the information from other computers on network 50. The server computer 54 preferably contains a transport recommendation program 68.

Program code and programs such as context program 66, activity data program 67, transport recommendation program 68, and cognitive personal selection assistant program 69 may be stored on at least one of one or more computer-readable tangible storage devices 830 shown in FIG. 2, on at least one of one or more portable computer-readable tangible storage devices 936 as shown in FIG. 2, or in a repository 53 connected to network 50, or may be downloaded to a device computer 52, a IoT device computer 56a-56n, personal imaging system computer 59 or server computer 54, for use. For example, program code and programs such as context program 66, activity data program 67, cognitive personal selection assistant program 69 and may be stored on at least one of one or more computer-readable tangible storage devices 830 on server computer 54 and downloaded to the device computer 52, IoT device computer 56a-56n, and personal imaging system computer 59 over network 50 for use. Alternatively, server computer 54 can be a web server, and the program code, and programs such as context program 66, activity data program 67, transport recommendation program 68, and cognitive personal selection assistant program 69 may be stored on at least one of the one or more computer-readable tangible storage devices 830 on server computer 54 and accessed by the device computer 52, IoT device computer 56a-56n, or personal imaging system computer 59. In other exemplary embodiments, the program code, and programs such as context program 66, activity data program 67, transport recommendation program 68, and cognitive personal selection assistant program 69 may be stored on at least one of one or more computer-readable storage devices 830 on the device computer 52, IoT device computer 56a-56n, and personal imaging system computer 59 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of device computer 52, IoT device computer 56a-56n, personal imaging system computer 59, and server computer 54 in which illustrative embodiments may be implemented. In FIG. 2, a device computer 52, a IoT device computer 56a-56n, a personal imaging system computer 59, and a server computer 54 include respective sets of internal components 800a, 800b, 800c, 800d and external components 900a, 900b, 900c, 900d. Each of the sets of internal components 800a, 800b, 800c, 800d includes one or more processors 820, one or more computer-readable Random Access Memory (RAMs) 822 and one or more computer-readable Read Only Memory (ROMs) 824 on one or more buses 826, one or more operating systems 828 and one or more computer-readable tangible storage devices 830. The one or more operating systems 828, context program 66, activity data program 67, transport recommendation program 68, and cognitive personal selection assistant program 69 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, Erasable Programmable Read-Only Memory (EPROM), flash memory or any other computer-readable tangible storage device that can store a computer program and digital information.

Each set of internal components 800a, 800b, 800c, 800d also includes a R/W drive or interface 832 to read from and write to one or more portable computer-readable tangible storage devices 936 such as a CD-ROM, DVD, memory stick, magnetic tape, magnetic disk, optical disk or semiconductor storage device. Context program 66, activity data program 67, transport recommendation program 68, and cognitive personal selection assistant program 69 can be stored on one or more of the portable computer-readable tangible storage devices 936, read via R/W drive or interface 832 and loaded into hard drive 830.

Each set of internal components 800a, 800b, 800c, 800d also includes a network adapter or interface 836 such as a TCP/IP adapter card. Context program 66, activity data program 67, transport recommendation program 68, and cognitive personal selection assistant program 69 can be downloaded to the device computer 52, the second device computer 56, the third device computer 59 and server computer 54 from an external computer via a network (for example, the Internet, a local area network or other, wide area network) and network adapter or interface 836. From the network adapter or interface 836, context program 66, activity data program 67, transport recommendation program 68 program 66, and cognitive personal selection assistant program 69 is loaded into hard drive 830. Context program 66, activity data program 67, transport recommendation program 68, and cognitive personal selection assistant program 69 can be downloaded to the server computer 54 from an external computer via a network (for example, the Internet, a local area network or other, wide area network) and network adapter or interface 836. From the network adapter or interface 836, context program 66, activity data program 67, transport recommendation program 68, and cognitive personal selection assistant program 69 are loaded into hard drive 830. The network may comprise copper wires, optical fibers, wireless transmission, routers, firewalls, switches, gateway computers and/or edge servers.

Each of the sets of external components 900a, 900b, 900c, 900d includes a computer display monitor 920, a keyboard 930, and a computer mouse 934. Each of the sets of internal components 800a, 800b, 800c, 800d also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Context program 66, activity data program 67, transport recommendation program 68, and cognitive personal selection assistant program 69 can be written in various programming languages including low-level, high-level, object-oriented or non object-oriented languages. Alternatively, the functions of a context program 66, activity data program 67, transport recommendation program 68, and cognitive personal selection assistant program 69 can be implemented in whole or in part by computer circuits and other hardware (not shown).

Embodiments of the present invention are capable of being implemented in a cloud computing environment and in conjunction with any other type of computing environment now known or later developed.

The server computer 54 and repository 53 may be practiced in distributed cloud computing environments where tasks are performed by remote processing devices that are linked through a communications network. In a distributed cloud computing environment, program modules may be located in both local and remote computer system storage media including memory storage devices. A computer system/server computer may also communicate with one or more external devices, such as device computer 52, IoT device computer 56a-56n, and personal imaging system computer 59. The computer system/server computer typically includes a variety of computer system readable media. Such media may be any available media that is accessible by computer system/server computer, and it includes both volatile and non-volatile media, removable and non-removable media.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
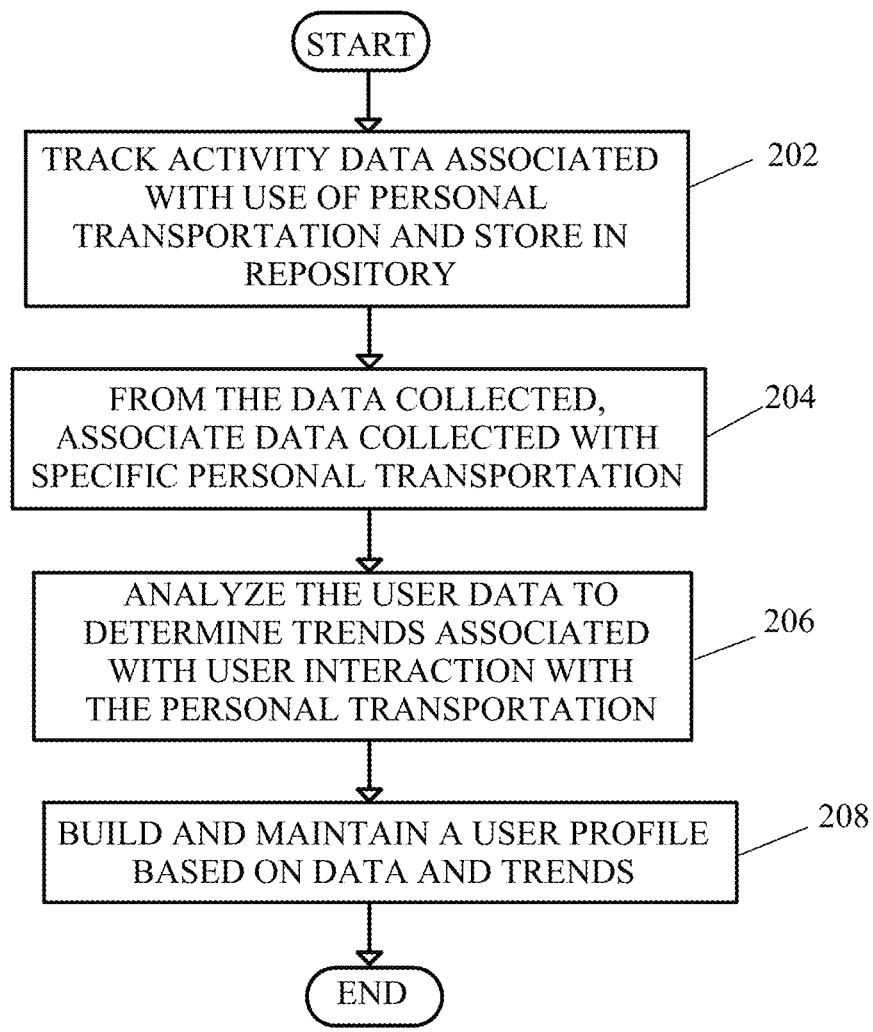
FIG. 3 shows a flow diagram of a method of determining a user profile for personal transportation recommendations.

FIG. 3 shows a flow diagram of a method of determining a user profile for personal transportation recommendations.

In a first step, activity data associated with use just prior to, during and after use of the personal transportation is tracked and stored in a repository, for example by the activity data program 67 and context program 66 (step 202).

Data associated with the user can be collected using microphones, biometric data, accelerometers of a user's IoT devices through the activity data program 67, global positioning system of a user's mobile device through the context program 66 or IoT device through the data activity data program 67 or context program 66, cameras associated with the personal transportation, public traffic or surveillance cameras, and point of view cameras associated with a user's augmented reality headset which can be accessed using the transport recommendation program 68.

Just prior to using the personal transportation, data associated with why a user selects a specific personal transportation is collected as well as data associated with the start and end location, time of day, projected route distance, and incline between the starting and end location is collected, for example through the context program 66. For example, data is collected in association with the following inquiries: Does the user select an electric bicycle when available? As the user is walking towards the bike rack, does the user select the closest bike? Does the user check the air pressure levels of the tires? Does the user usually adjust the seat to a certain height or make other adjustments?

During use of the personal transportation, data is collected and analyzed to determine the user's ability—beginner, intermediate, or advanced; braking preferences—aggressive or gradual; gauge brake sensitivity from the accelerometer, air pressure level of the tires; brake noise, light associated with the front of the bike, and other data.

Data is also collected directly from the user just after the use of the personal transportation. For example, data collected can include user satisfaction rating of the personal transportation and specific complaints or issues for maintenance associated with the personal transportation. The inputted data can be entered manually by the user or through audio input.

From the data collected, data is associated with a specific personal transportation and stored in a repository (step 204), for example repository 53 accessible by the personal transportation recommendation program 68. For example, specific issues relating to maintenance of the personal transportation as well as a current configuration of the personal transportation are stored relative to each personal transport. For example, low tire pressure in a front tire and seat configuration of x inches from the frame can stored in with a specific bicycle based on the bicycle's identifier.

The personal transportation recommendation program 68 analyzes the user data to determine trends associated with the user interaction with the personal transportation (step 206). For example, determining whether there is a specific type of personal transportation a user selects each time or adjustments made for certain distances.

Then, the personal transportation recommendation program 68 builds and maintains a user profile for each user (step 208) and the method ends. Data associated with the user is preferably stored in a user profile and is stored in a repository, for example repository 53. The user profile can additionally be stored in a different repository. The user profile preferably includes user data, user preferences, and personal transportation requirements/tolerances. User data can include user height, user weight, and user rider ability. User preferences can include seat height or placement preferences, seat type preferences, gear system preferences, manual vs electric preferences, and storage vs no storage preferences. Personal transportation requirements/tolerances can include braking capabilities, air pressure level of the tires, gear health, and squeaking brakes. It should be noted that the user profile is updated each time the user chooses a personal transportation.

Figure 4:
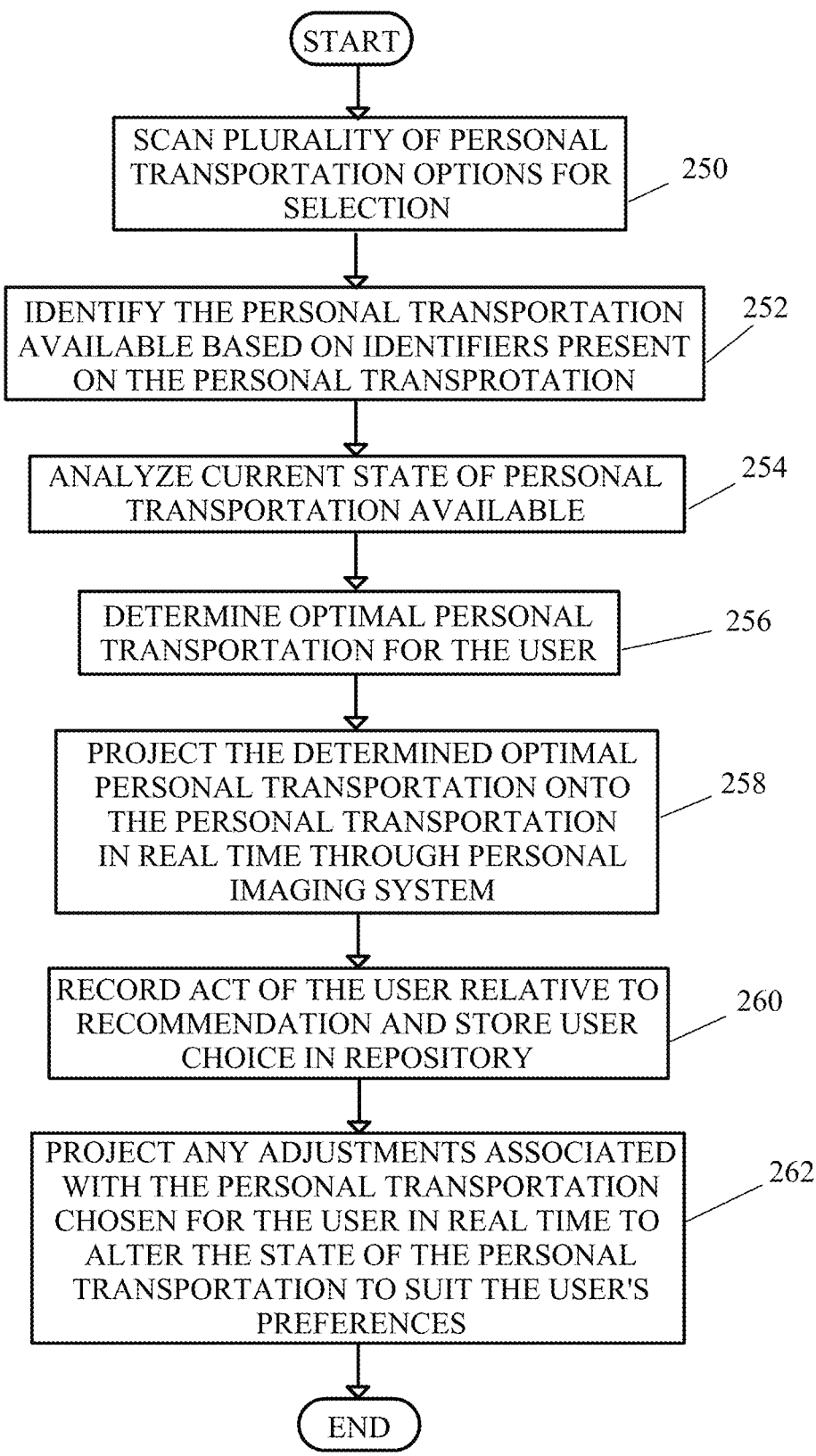
FIG. 4 shows a flow diagram of a method of providing personal transportation recommendations in augmented reality in real time to a user.

FIG. 4 shows a flow diagram of a method of providing personal transportation recommendations in augmented reality in real time to a user.

It should be noted that the method of FIG. 3 takes place prior to or during the method of FIG. 4 and that the method of FIG. 4 utilizes the data associated with the user profile and the repository.

In a first step, a user using a personal imaging system scans a plurality of personal transportation options for selection (step 250).

The cognitive personal selection assistant program 69 of the personal imaging system identifies the personal transportation available based on identifiers present on the personal transportation (step 252). The identifiers can be alphanumeric, numeric, a bar code, a QR code, or any other identifier used to distinguish between items. The identifiers are used to look up specifics for personal transportation in the repository 53.

The cognitive personal selection assistant program 69 analyzes the current state of personal transportation available (step 254). For example, the cognitive personal selection assistant program 69 can determine that the tire pressures are low.

The cognitive personal selection assistant program 69 then determines the optimal personal transportation for the user from the identified personal transportation based on the user profile, repository data of the identified personal transportation, current state of the personal transportation, distance to the user, and start and ending location (step 256). The optimal personal transportation can be determined using a k-nearest neighbors algorithm (k-NN) using a neural network.

The cognitive personal selection assistant program 69 projects a notification of the determination of the optimal personal transportation onto or overlaid onto the personal transportation seen through the personal imaging system in real time by the user (step 258).

The cognitive personal selection assistant program 69 records the act of the user relative to the recommendation and stores the data associated with the choice of personal transportation in the user's profile (step 260).

It should be noted that when the user selects the recommendation given as the optimal personal transportation, the choice provides positive reinforcement for the learning algorithm associated with the system and the choice is stored in a repository 53. When the user does not select the recommendation given as the optimal personal transportation, the learning algorithm receives negative feedback. The negative feedback stores the user's alternate personal transportation selection in the repository 53 and analyzes the attributes of the alternative selection to identify any conditions or data that may not have been considered or overlooked by the transport recommendation program 68.

The cognitive personal selection assistant program 69 projects any adjustments associated with the personal transportation chosen for the user through the personal imaging system to alter the state of the personal transportation to suit the user's preferences (step 262) and the method ends. It should be noted that precautions or other safety or maintenance notifications associated with the personal transportation can also be shown to the user through the personal imaging system.

Figure 5:
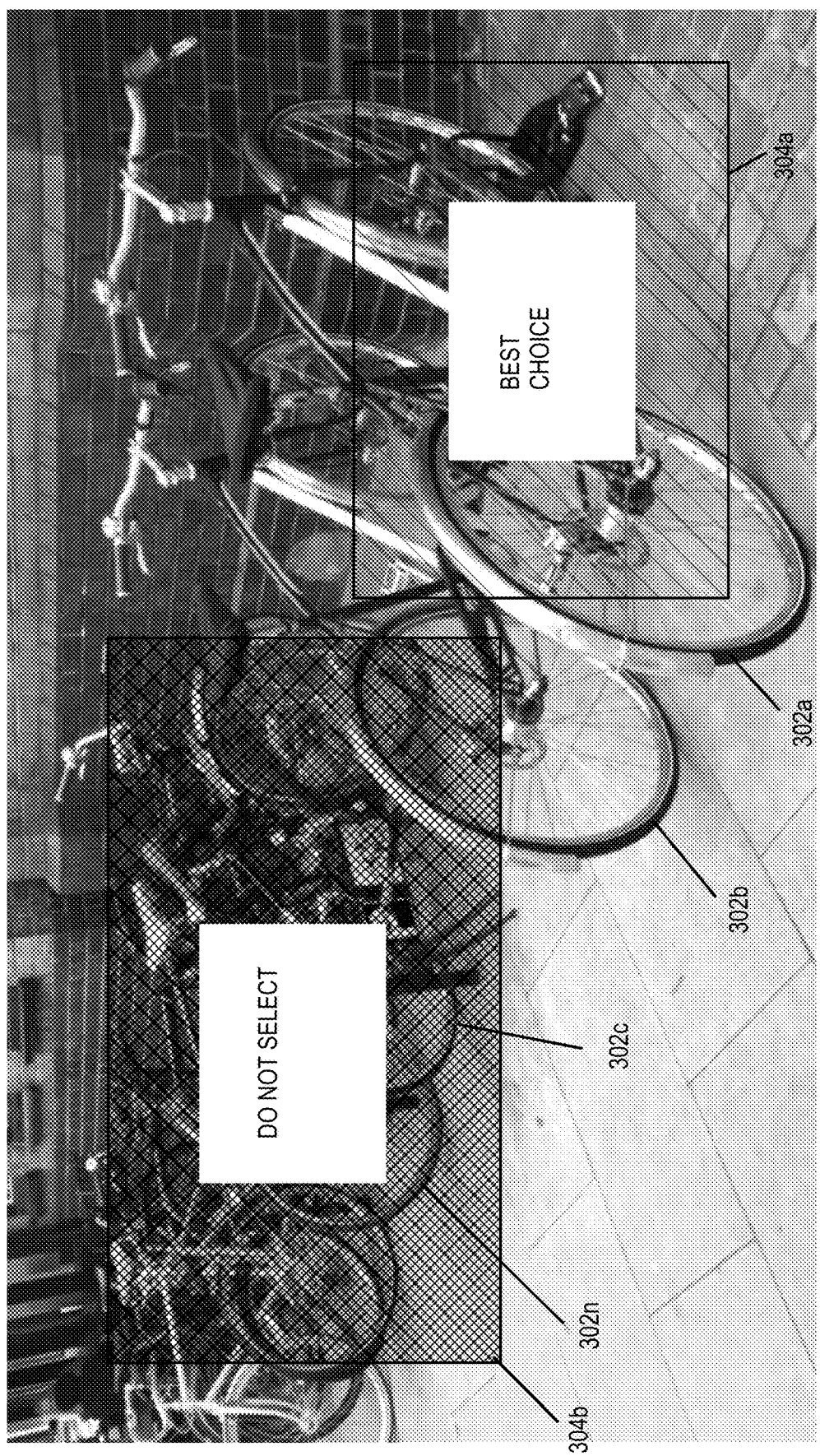
FIG. 5 shows an example of an augmented reality display over personal transportation including recommendations for the user in real time.

FIG. 5 shows an example of an augmented reality display over personal transportation including recommendations for the user in real time.

The personal imaging system display shows a plurality of overlays 304a-304b which are present over a plurality of bicycles 302a-302n. As shown, bicycle 302a is recommended to the user for personal transportation from the plurality of bicycles 302a-302n. Bicycles 302b, 302c, 302n are not recommended for the user. Additionally, maintenance status of a bicycle can also be shown.

Figure 6:
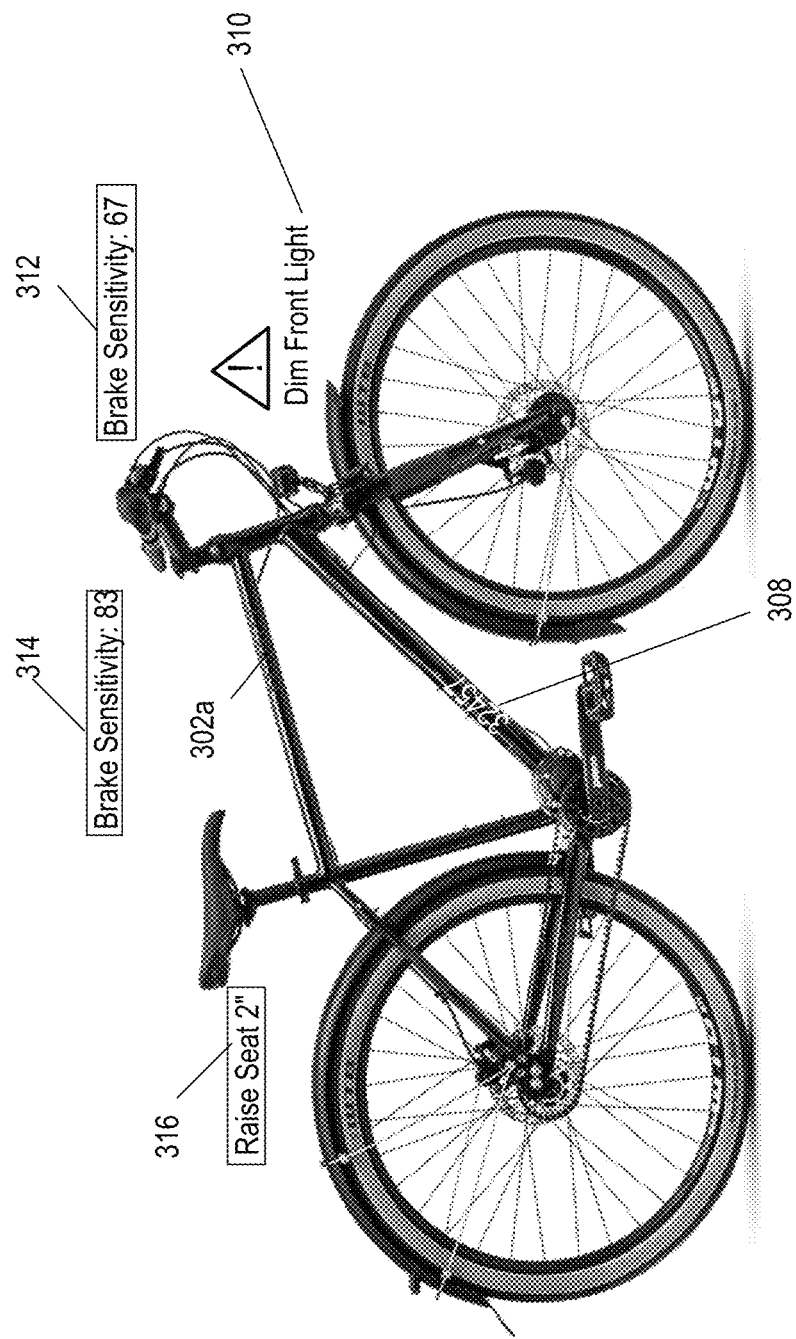
FIG. 6 shows an example of an augmented reality display over chosen personal transportation identifying characteristics of the transportation to the user in real time.

FIG. 6 shows an example of an augmented reality display over a chosen personal transportation identifying characteristics of the transportation to the user in real time.

While looking at the chosen bicycle 302a, the AR shows the user maintenance issues/safety notifications specific to the bicycle chosen by the user as well adjustments that need to be made in real time based on the bicycle's status associated with its unique identifier 308. For example, for the bicycle 302a chosen by the user, a notification regarding the dimness of the front light 310 is displayed (see triangle), along with the brake sensitivity 312, 314 (see boxes). Furthermore, the personal imaging system displays adjustments that need to be made in order to suit the user's preferences, for example raising the seat 316 (see box).

Example

User A is a 6'3" man working as an investment banker. User A enjoys biking to work for the exercise and the energy he gets before work in the morning, classifying User A as an advanced biker. User A is looking for an easily adjustable bike that can accommodate his height as he usually has to adjust every bike to suit. User A rides within a congested city for 10 miles as recorded by his IoT devices 56a-56n through the activity data program 67. User A additionally needs storage in order to accommodate his work bag and change of clothing, which needs to be balanced relative to the bike. User A additionally requires a strong brake to accommodate stopping at the red lights within the city as determined by the context program 66. User A is also concerned with tire blow issues during his ride, as he has experienced tire failures previously as determined by the context program 66. The data regarding previous rides as recorded by the IoT devices 56a-56n is stored in a user profile in a repository 53 associated with User A as well as user preferences. The data is cross referenced relative to a repository 53 associated with all of the personal transportation available near User A.

In the above example, the bike factors are seat height, tire levels, electric vs non-electric, braking sensitivity, basket vs no basket, light on the front of the bike, and seat type.

The transport recommendation program 68, based on the above data, in real time, searches for an appropriate bicycle to accommodate user A from a group of bicycles available as shown in FIG. 5. Real time AR notifications via the cognitive personal selection assistant program 69 of the personal imaging system 59 indicates which bicycle(s) are recommended for User A to use for his trip. FIG. 6 shows User A how to adjust the bicycle to suit the User. For example, raising the seat 2 inches to accommodate for the user's height.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing personal transportation device recommendations via a personal imaging system in real time to a user comprising the steps of:
    the personal imaging system searching for personal transportation device available for selection;
    the personal imaging system identifying the personal transportation device available based on identified identifiers of the personal transportation device available;
    the personal imaging system analyzing a current state of the personal transportation device available;
    the personal imaging system determining an optimal personal transportation device selection for the user from the personal transportation device available;
    the personal imaging system projecting a notification indicating the determined optimal personal transportation device onto the personal transportation device available for selection for the user in real time;
    the personal imaging system recording a selection of the user of the personal transportation device for use by the user; and
    the personal imaging system projecting at least one of an adjustment regarding one or more factors associated with the personal transportation device selected in real time, wherein projecting the at least one adjustment indicates to the user to alter the personal transportation device selected.

2. The method of claim 1, wherein the personal transportation device has two wheels.

3. The method of claim 1, wherein the personal transportation device has three wheels.

4. The method of claim 1, wherein the optimal personal transportation device election is determined based on data representative of at least: a user profile of user preferences, data of the identified personal transportation device available, the current state of the personal transportation device available, start location, end location, and distance between the start location and the end location.

5. The method of claim 4, wherein the data is determined by Internet of Things devices.

6. The method of claim 1, wherein the optimal personal transportation device selection is determined using a k-nearest neighbors algorithm via a neural network.

7. A computer program product for providing personal transportation device recommendation via a personal imaging system in real time to a user, the personal imaging system having a computer comprising at least one processor, one or more memories, one or more computer readable storage media, the computer program product comprising a computer readable storage medium having program instructions embodied therewith, the program instructions executable by the computer to perform a method comprising:
    searching, by the computer of the personal imaging system, for personal transportation device available for selection;
    identifying, by the computer of the personal imaging system, the personal transportation device available based on identified identifiers of the personal transportation device available;
    analyzing, by the computer of the personal imaging system, a current state of the personal transportation device available;
    determining, by the computer of the personal imaging system, an optimal personal transportation device selection for the user from the personal transportation device available;
    projecting, by the computer of the personal imaging system, a notification indicating the determined optimal personal transportation device onto the personal transportation device available for selection for the user in real time;
    recording, by the computer of the personal imaging system, a selection of the user of the personal transportation device for use by the user; and
    projecting, by the computer of the personal imaging system, at least one of an adjustment regarding one or more factors associated with the personal transportation selected device in real time, wherein projecting the at least one adjustment indicates to the user to alter the personal transportation device selected.

8. The computer program product of claim 7, wherein the personal transportation device has two wheels.

9. The computer program product of claim 7, wherein the personal transportation device has three wheels.

10. The computer program product of claim 7, wherein the optimal personal transportation device selection is determined based on data representative of at least: a user profile of user preferences, data of the identified personal transportation device available, the current state of the personal transportation device available, start location, end location, and distance between the start location and the end location.

11. The computer program product of claim 10, wherein the data is determined by Internet of Things devices.

12. The computer program product of claim 7, wherein the optimal personal transportation device selection is determined using a k-nearest neighbors algorithm via a neural network.

13. A personal imaging system for providing personal transportation device recommendation to a user in real time, the personal imaging system comprising a computer comprising at least one processor, one or more memories, one or more computer readable storage media having program instructions executable by the computer to perform the program instructions comprising:
- searching, by the computer of the personal imaging system, for personal transportation device available for selection;
- identifying, by the computer of the personal imaging system, the personal transportation device available based on identified identifiers of the personal transportation device available;
- analyzing, by the computer of the personal imaging system, a current state of the personal transportation device available;
- determining, by the computer of the personal imaging system, an optimal personal transportation device selection for the user from the personal transportation device available;
- projecting, by the computer of the personal imaging system, a notification indicating the determined optimal personal transportation device onto the personal transportation device available for selection for the user in real time;
- recording, by the computer of the personal imaging system, a selection of the user of the personal transportation device for use by the user; and
- projecting, by the computer of the personal imaging system, of an adjustment regarding one or more factors associated with the personal transportation device selected in real time, wherein projecting the adjustment indicates to the user to alter the personal transportation device selected.

14. The personal imaging system of claim 13, wherein the personal transportation device has two wheels.

15. The personal imaging system of claim 13, wherein the personal transportation device has three wheels.

16. The personal imaging system of claim 13, wherein the optimal personal transportation device selection is determined based on data representative of at least: a user profile of user preferences, data of the identified personal transportation device available, the current state of the personal transportation device available, start location, end location, and distance between the start location and the end location.

17. The personal imaging system of claim 16, wherein the data is determined by Internet of Things devices.

18. The personal imaging system of claim 13, wherein the optimal personal transportation device selection is determined using a k-nearest neighbors algorithm via a neural network.

* * * * *